United States Patent
Ito et al.

(10) Patent No.: US 9,473,055 B2
(45) Date of Patent: Oct. 18, 2016

(54) ELECTRIC WORKING MACHINE

(71) Applicant: HITACHI KOKI CO., LTD., Tokyo (JP)

(72) Inventors: Tatsuya Ito, Ibaraki (JP); Mizuho Nakamura, Ibaraki (JP); Yoshio Iimura, Ibaraki (JP); Tomomasa Nishikawa, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 130 days.

(21) Appl. No.: 13/967,937

(22) Filed: Aug. 15, 2013

(65) Prior Publication Data
US 2014/0049204 A1    Feb. 20, 2014

(30) Foreign Application Priority Data

Aug. 20, 2012    (JP) ................ 2012-181348

(51) Int. Cl.
H02P 1/00     (2006.01)
H02P 7/14     (2006.01)
H02P 7/285    (2016.01)

(52) U.S. Cl.
CPC ............ *H02P 7/14* (2013.01); *H02P 7/285* (2013.01)

(58) Field of Classification Search
CPC ..... B60W 10/08; Y02T 10/7005; H02P 6/14
USPC ................................. 318/139, 461
See application file for complete search history.

(56) References Cited

U.S. PATENT DOCUMENTS

| | | | |
|---|---|---|---|
| 3,378,662 A * | 4/1968 | Sorenson | 200/522 |
| 3,781,579 A * | 12/1973 | Rosenthal et al. | 310/68 A |
| 4,574,481 A * | 3/1986 | Ericsson | 30/296.1 |
| 5,195,164 A * | 3/1993 | Lambert | 392/385 |
| 6,105,206 A * | 8/2000 | Tokumaru | A01G 1/125 15/344 |
| 6,610,946 B2 * | 8/2003 | Covell et al. | 200/321 |
| 6,660,894 B1 * | 12/2003 | Wu et al. | 585/326 |
| 6,700,212 B2 * | 3/2004 | Ackermann | F02N 11/04 290/36 R |
| 6,994,068 B2 * | 2/2006 | Menzel | F02B 63/02 123/192.1 |
| 7,152,853 B2 * | 12/2006 | Menzel | B25F 5/006 173/162.2 |
| 7,204,322 B2 * | 4/2007 | Sakai | B25D 11/125 173/117 |
| 7,538,503 B2 * | 5/2009 | Machens | A01D 34/90 30/276 |
| 8,890,449 B2 * | 11/2014 | Suzuki et al. | 318/400.01 |

(Continued)

FOREIGN PATENT DOCUMENTS

| | | |
|---|---|---|
| JP | 56-40488 | 4/1981 |
| JP | 5-176574 A | 7/1993 |

(Continued)

OTHER PUBLICATIONS

Japanese Office Action for the related Japanese Patent Application No. 2012-181348 dated Nov. 17, 2015.

*Primary Examiner* — Rina Duda
(74) *Attorney, Agent, or Firm* — Kenealy Vaidya LLP

(57) ABSTRACT

An electric working machine including: an input part; a control unit configured to control a motor in accordance with an operation amount of the input part; and a switching part; wherein, when a predetermined operation is performed to the switching part, the control unit shifts to a fixed control mode in which the motor is controlled in accordance with an operation amount of the input part at the time when the predetermined operation is performed to the switching part, irrespective of an operation amount of the input part after the predetermined operation is performed to the switching part.

2 Claims, 4 Drawing Sheets

(56) References Cited

U.S. PATENT DOCUMENTS

| | | | |
|---|---|---|---|
| 2003/0089511 A1* | 5/2003 | Tsuneda | B25F 5/001 173/217 |
| 2003/0233730 A1* | 12/2003 | Sanders et al. | 15/405 |
| 2006/0179602 A1 | 8/2006 | Schliemann et al. | |
| 2009/0195204 A1* | 8/2009 | Gumpert | B25D 11/00 318/460 |
| 2009/0241285 A1* | 10/2009 | Hinklin et al. | 15/330 |
| 2011/0273117 A1* | 11/2011 | Nakamura | B25D 11/005 318/139 |
| 2012/0079799 A1 | 4/2012 | Matsunaga et al. | |
| 2012/0193119 A1* | 8/2012 | Kempf et al. | 174/50.53 |
| 2013/0137548 A1* | 5/2013 | Velamakanni | B60W 10/026 477/181 |
| 2013/0199812 A1* | 8/2013 | Dangelmaier et al. | 173/179 |
| 2013/0200837 A1* | 8/2013 | Oerding | H02P 29/00 318/504 |

FOREIGN PATENT DOCUMENTS

| | | |
|---|---|---|
| JP | 6-153557 A | 5/1994 |
| JP | 9-159255 A | 6/1997 |
| JP | 2001-128475 A | 5/2001 |
| JP | 2006-217843 A | 8/2006 |
| JP | 2009-91719 A | 4/2009 |
| JP | 2009-91908 A | 4/2009 |
| JP | 2010-12571 A | 1/2010 |
| WO | 2009/044934 A1 | 4/2009 |

* cited by examiner

ELECTRIC WORKING MACHINE

CROSS-REFERENCE TO RELATED APPLICATIONS

This application claims priority from Japanese Patent Application No. 2012-181348 filed on Aug. 20, 2012, the entire contents of which are incorporated herein by reference.

TECHNICAL FIELD

Aspects of the present invention relate to an electric working machine such as a blower, which controls a motor according to an operation amount of an input part such as a trigger switch.

BACKGROUND

A cordless portable blower which blows off dust or the like to perform cleaning has been known (for example, see JP-A-2009-91908). In the cordless portable blower, a cleaning operation is performed in such a way that a motor built into a main body is driven by electric power of a battery pack to rotate a fan and an air flow generated is injected from an air outlet through a nozzle. A worker performs the cleaning operation in a state of grasping a handle part of the blower. Generally, in order to blow off dust or the like on the ground, a worker holds the main body of the blower in a state where the nozzle is inclined obliquely forward and downward and swings the main body from side to side to swing the nozzle from side to side, thereby blowing off the dust or the like. Meanwhile, there is also a blower which can also collect dust. In addition, in a blower having an air flow rate control function, the fan is rotated by driving the motor in a rotational speed according to a pulling amount (pulling value) of the trigger switch by a worker. That is, a worker can control the blower in a desired air flow rate by controlling a pulling amount of the trigger switch.

Since it is necessary for a worker to keep a pulling amount of the trigger switch to be constant for a long time when trying to drive the above-described blower at a constant air flow rate for a long time, there is a problem that his fingers become tired or it is difficult to grasp the main body while changing posture of the main body. As a means to solve this problem, it is conceivable to provide a mechanical fixing means for preventing the trigger switch from being returned to an initial position even when a worker detaches his fingers from the trigger switch. However, such a mechanical fixing means leads to complexity of the structure of the blower and is a factor for cost increase.

SUMMARY

The present invention has been made in consideration of the above circumstances and an object of the present invention is to provide an electric working machine in which control according to an operation amount of an input part can be continuously performed without depending on a mechanical fixing means even when a worker does not continuously keep the input part in a constant operation amount.

According to an aspect of the present invention, there is provided an electric working machine including: an input part; a control unit configured to control a motor in accordance with an operation amount of the input part; and a switching part; wherein, when a predetermined operation is performed to the switching part, the control unit shifts to a fixed control mode in which the motor is controlled in accordance with an operation amount of the input part at the time when the predetermined operation is performed to the switching part, irrespective of an operation amount of the input part after the predetermined operation is performed to the switching part.

According to the present invention, it is possible to realize an electric working machine in which control according to an operation amount of an input part can be continuously performed without depending on a mechanical fixing means even when a worker does not continuously keep the input part in a constant operation amount.

SUMMARY

Figure 1:
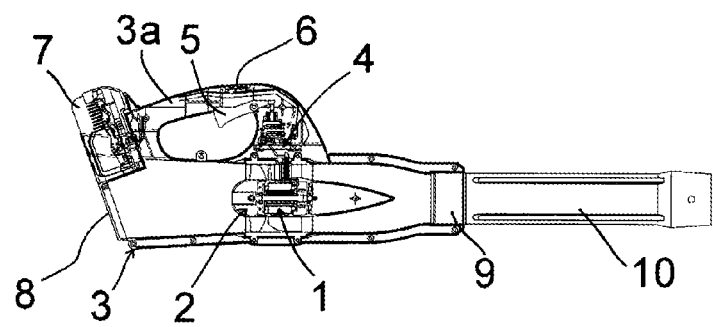
FIG. 1 is a side sectional view of a cordless portable blower according to an illustrative embodiment of the present invention.

Hereinafter, a preferred embodiment of the present invention will be described in detail by referring to the accompanying drawings. The same or similar reference numerals are applied to the same or similar parts and elements throughout the drawings, and a duplicated description thereof will be omitted. Further, the embodiment is illustrative and not intended to limit the present invention. It should be noted that all the features and their combinations described in the embodiment are not necessarily considered as an essential part of the present invention.

FIG. 1 is a side sectional view of a cordless portable blower according to an illustrative embodiment of the present invention. The cordless portable blower includes a brushless motor 1, a fan 2 and a micro-computer 4 as a control unit, which are provided in the inside of a body housing 3. In a handle part 3a (grip part) of the body housing 3, a trigger switch 5 (speed control trigger switch) as an example of an input part is provided on an index finger side thereof and a tact switch 6 as an example of a switching part is provided on a thumb side thereof. A battery pack 7 as a battery is detachably mounted to the body housing 3 at the rear of the handle part 3a. An air inlet 8 is provided at a rear end (left end in FIG. 1) of the body housing 3 and an air outlet 9 is provided at a front end (right end in FIG. 1) of the body housing 3. A nozzle 10 is attached to the air outlet 9. As the trigger switch 5 is pulled by a worker, power is supplied from the battery pack 7 to the brushless motor 1 to rotate the brushless motor 1 and air flow is generated by the fan 2 which is rotated, for example, integrally with the brushless motor 1 and air drawn from the air inlet 8 is blown to the outside from the air outlet 9 via the nozzle 10.

Figure 2:
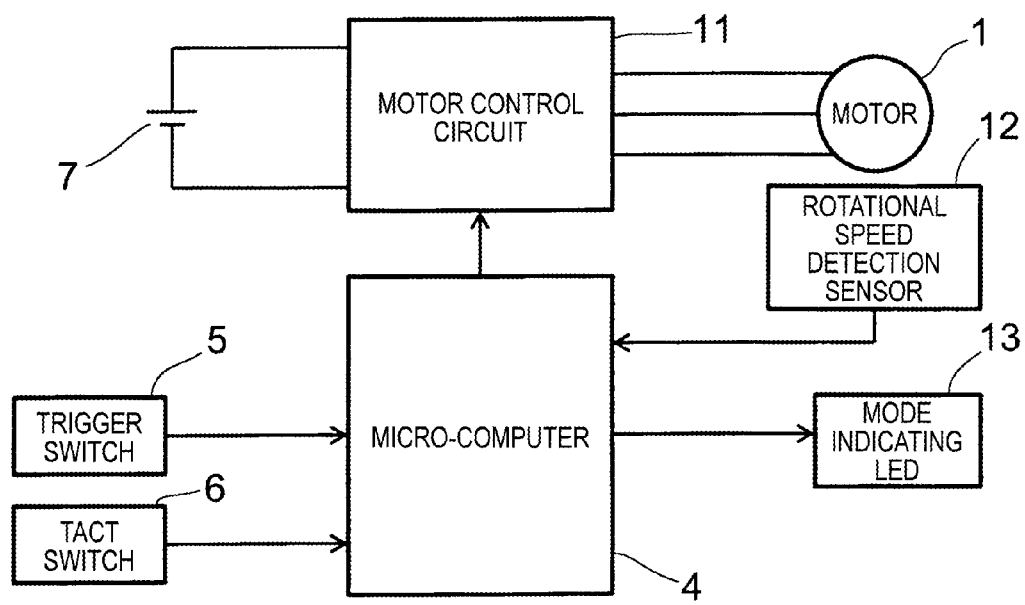
FIG. 2 is a block diagram of the cordless portable blower shown in FIG. 1.

FIG. 2 is a block diagram of the cordless portable blower shown in FIG. 1. A motor control circuit 11 is an inverter circuit including a plurality of switching elements (FET, etc.), for example, and converts DC power supplied from the battery pack 7 into AC power to supply the converted AC power to the brushless motor 1. A rotational speed detection sensor 12 detects a rotational speed (and a rotational position) of the brushless motor 1. A mode indicating LED 13 is an example of a notification means to notify a worker of information including a present control mode (whether the control mode is a fixed control mode described later or not). The micro-computer 4 detects a pulling amount (operation amount) of the trigger switch 5 and applies drive signal (for example, PWM signal) to the motor control circuit 11 based on the pulling amount. In a case of a constant rotation control, the micro-computer 4 applies the drive signal to the motor control circuit 11 while monitoring detection signal of the rotational speed detection sensor 12, so that the motor has a rotational speed according to the pulling amount of the trigger switch 5. Control of the rotational speed is performed by controlling the duty ratio of the drive signal applied to the motor control circuit 11, for example.

When a predetermined operation (for example, short pushing operation) is performed to the tact switch 6, the micro-computer 4 shifts to the fixed control mode. Specifically, the micro-computer 4 monitors voltage of a terminal connected to the tact switch 6 and shifts to the fixed control mode when the voltage of the terminal is changed by the predetermined operation, that is, when a predetermined electric signal (on/off signal) is inputted to the terminal. In the fixed control mode, the micro-computer 4 controls the brushless motor 1 (controls the drive signal applied to the motor control circuit 11) in accordance with a pulling amount of the trigger switch 5 at the time when the predetermined operation is performed to the tact switch 6 (that is, just before shifting to the fixed control mode), irrespective of a pulling amount of the trigger switch 5 after the predetermined operation is performed to the tact switch 6.

Figure 3:
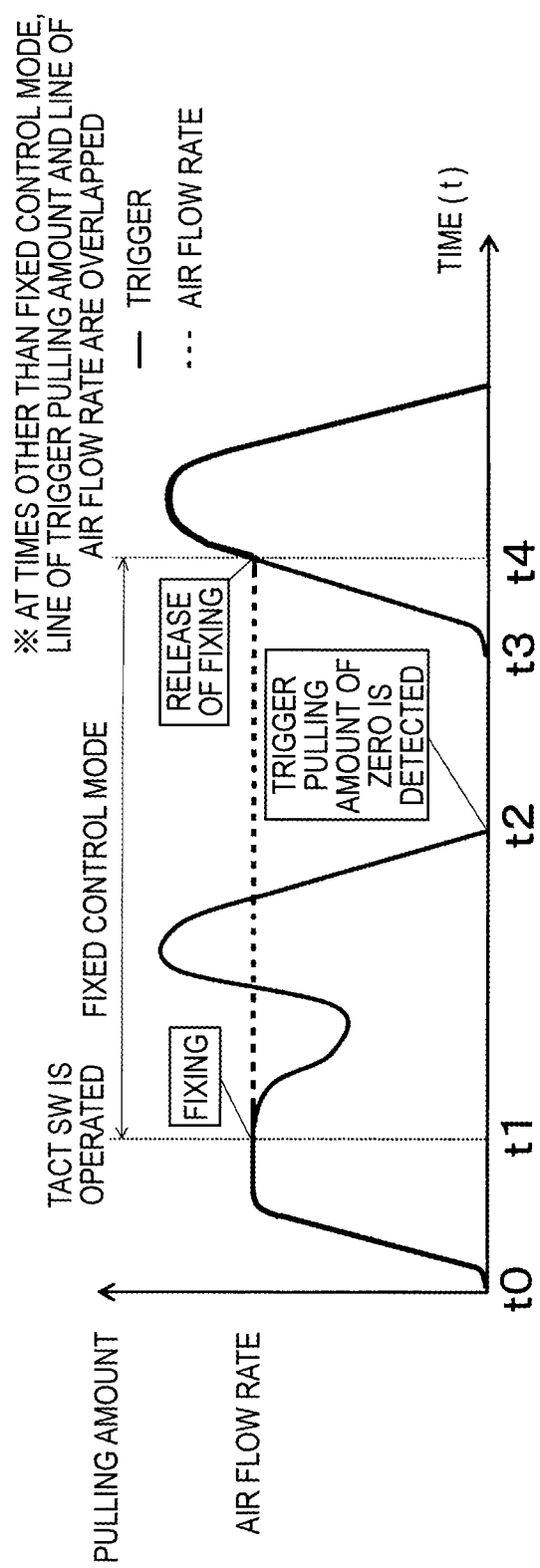
FIG. 3 is a time chart showing an exemplary flow of transition to a fixed control mode and release of the fixed control mode in the illustrative embodiment.

FIG. 3 is a time chart showing an exemplary flow of transition to a fixed control mode and release of the fixed control mode in the illustrative embodiment. A worker starts to pull the trigger switch 5 at time t0, operates the trigger switch 5 until a predetermined pulling amount (air flow rate) is obtained and performs the predetermined operation on the tact switch 6 at time t1. Then, the micro-computer 4 shifts to the fixed control mode. In the example shown in FIG. 1, although a worker changes the pulling amount of the trigger switch 5 during the period of the fixed control mode (time t1 to t4), the air flow rate is constant and is not changed because the micro-computer is in the fixed control mode. A worker makes the pulling amount of the trigger switch 5 being zero at time t2. Here, since the trigger switch 5 is biased to cause a pulling amount thereof to be zero (to return to an initial position), a pulling amount of the trigger switch 5 becomes zero naturally when a worker detaches his fingers from the trigger switch 5. The micro-computer 4 detects that a pulling amount of the trigger switch 5 is zero. And then, a worker starts to pull the trigger switch 5 again at time t3 and the micro-computer 4 detects that a pulling amount of the trigger switch 5 at time t4 is equal to or greater than a pulling amount of the trigger switch at time t1. Here, as an example, a release condition of the fixed control mode may be that a pulling amount of the trigger switch 5 becomes zero during the fixed control mode and then the pulling amount of the trigger switch 5 becomes equal to or greater than the pulling amount of the trigger switch just before shifting to the fixed control mode. For this reason, the micro-computer 4 releases the fixed control mode and returns to a normal control mode in which the brushless motor 1 is controlled in accordance with a present pulling amount of the trigger switch 5. Here, the release condition of the fixed control mode may be that a pulling amount of the trigger switch 5 is equal to or greater than a preset pulling amount, instead of the pulling amount of the trigger switch 5 just before shifting to the fixed control mode. In the example of FIG. 3, a worker returns the trigger switch 5 to the initial position after release of the fixed control mode, so that the operation is finished. Meanwhile, the fixed control mode may be released by performing the predetermined operation again to the tact switch 6 during execution of the fixed control mode, and the air flow rate may be zero therewith.

Figure 4:
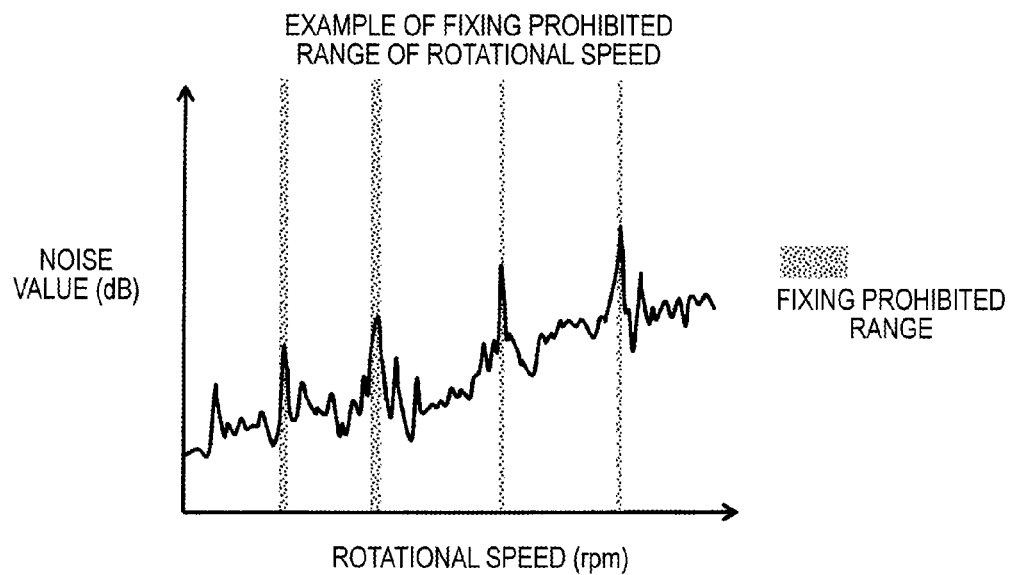
FIG. 4 is an exemplary characteristic diagram showing noise values corresponding to rotational speeds of a brushless motor 1 in the illustrative embodiment (part 1)

FIG. 4 is an exemplary characteristic diagram showing noise values corresponding to rotational speeds of the brushless motor 1 in the illustrative embodiment (part 1). By referring to FIG. 4, a fixing prohibited range (fixing prohibited rotational speed) of the rotational speed in the fixed control mode will be described. Generally, there is a correlation that the higher the rotational speed of the brushless motor 1 (that is, the higher the rotational speed of the fan 2), the larger the noise of the blower. However, there exists a rotational speed or a range of rotational speed in which the noise value is significantly large as compared to surrounding rotational speeds, owing to factors such as natural vibration. For this reason, in the present embodiment, the vicinity of a rotational speed in which the noise value is significantly large as compared to surrounding rotational speeds is defined as the fixing prohibited range of the rotational speed in the fixed control mode.

Figure 5:
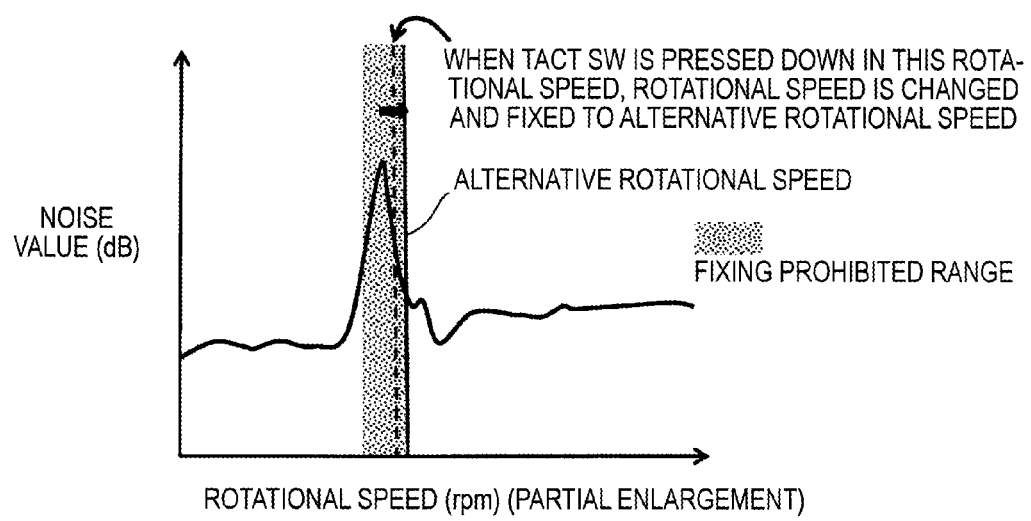
FIG. 5 is an exemplary characteristic diagram showing noise values corresponding to rotational speeds of the brushless motor 1 in the illustrative embodiment (part 2)

FIG. 5 is an exemplary characteristic diagram showing noise values corresponding to rotational speeds of the brushless motor 1 in the illustrative embodiment (part 2). In FIG. 5, a horizontal axis is enlarged as compared to FIG. 4 and only one fixing prohibited range is shown. In a case where the rotational speed of the brushless motor 1 is within the fixing prohibited range when the predetermined operation is performed to the tact switch 6, the micro-computer 4 changes the rotational speed of the brushless motor 1 from the rotational speed when the predetermined operation is performed to the tact switch 6 to an alternative rotational speed (the micro-computer 4 fixes the rotational speed of the brushless motor 1 to the alternative rotational speed in the fixed control mode), as shown in FIG. 5. For example, the alternative rotational speed is defined to be outside of the fixing prohibited range and closest to the rotational speed of the brushless motor 1 when the predetermined operation is performed to the tact switch 6. In this case, whether the rotational speed becomes higher or lower when being changed to the alternative rotational speed varies moment to moment. Meanwhile, in order to unify whether the rotational speed becomes higher or lower when being changed to the alternative rotational speed, the alternative rotational speed may be defined to be outside of the fixing prohibited range and near either of an upper limit or a lower limit of the fixing prohibited range.

Figure 6:
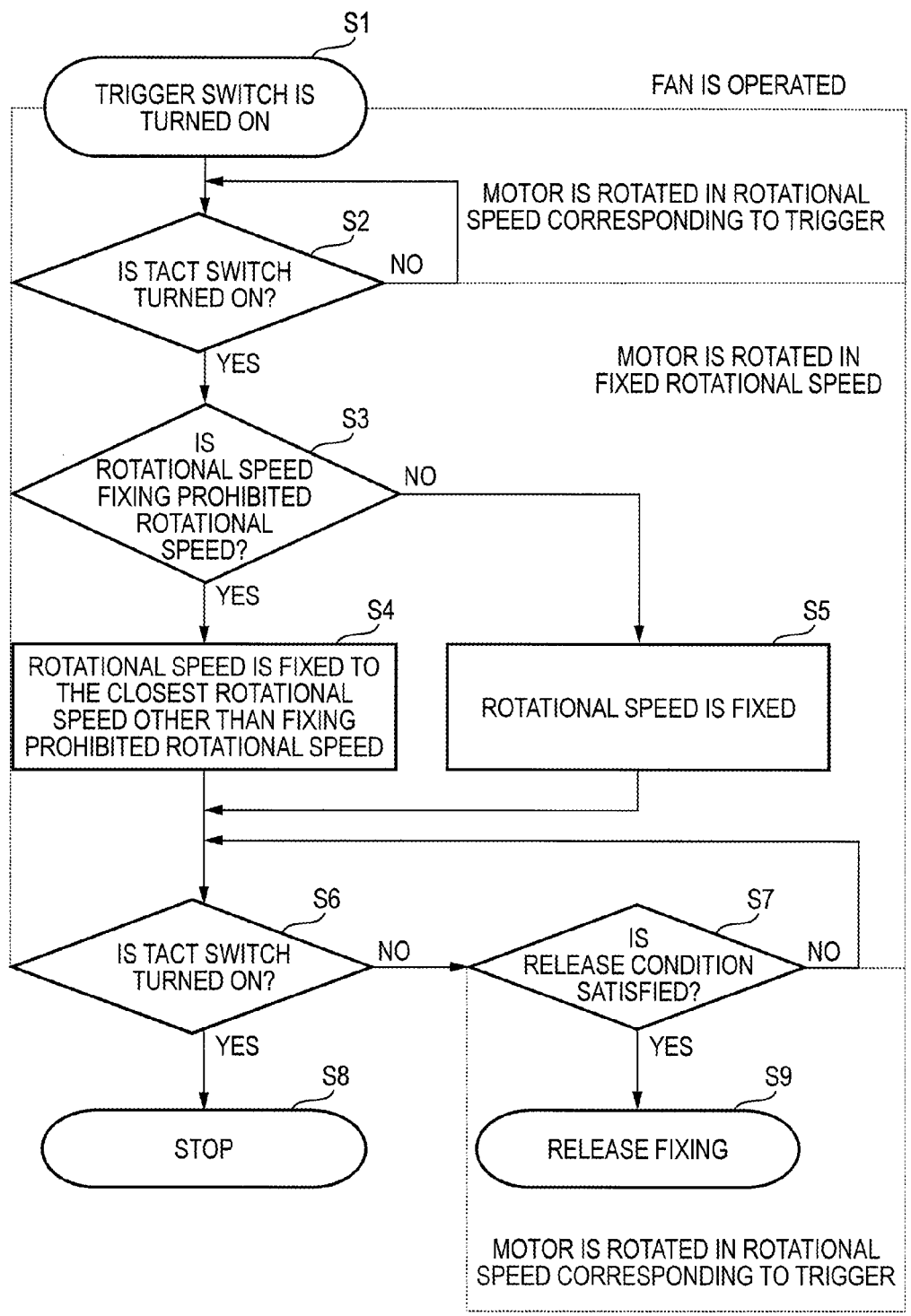
FIG. 6 is a flow chart showing an operation of the cordless portable blower shown in FIG. 1.

FIG. 6 is a flow chart showing an operation of the cordless portable blower shown in FIG. 1. The cordless portable blower is started to operate when the trigger switch 5 is pulled by a worker (S1). Before transition to the fixed control mode, the micro-computer 4 is operated in the normal mode in which the brushless motor 1 is controlled in accordance with a present pulling amount of the trigger switch 5 (N in S2). When a worker performs the predetermined operation to the tact switch 6 (Y in S2), the micro-computer 4 shifts to the fixed control mode. That is, in a case where the rotational speed of the brushless motor 1 when the predetermined operation is performed to the tact switch 6 by a worker is detected by signal from the rotational speed detection sensor 12 and the rotational number is within the fixing prohibited range, that is, the rotational speed is the fixing prohibited rotational speed (Y in S3), the rotational speed is changed and fixed to a rotational speed which is not the fixing prohibited rotational speed but closest thereto (S4). When the rotational speed is outside of the fixing prohibited range (N in S3), the rotational speed is fixed without change (S5). The fixed control mode is continued until the tact switch 6 is operated again or until the release condition of the fixed control mode is satisfied (N in S6 and N in S7). Meanwhile, when the tact switch 6 is operated again by a worker during execution of the fixed control mode (Y in S6), the micro-computer 4 stops the brushless motor 1, that is, stops the operation of the cordless portable blower (S8). In addition, when the worker returns the trigger switch 5 to the initial position and then further pulls the trigger switch 5 from the position just before shifting to the fixed control mode, so that the release condition of the fixed control mode is satisfied during execution of the fixed control mode (Y in S7), the fixed control mode is released (S9). After the release of the fixed control mode, the micro-computer 4 is operated in a normal mode in which the brushless motor 1 is controlled in accordance with a present pulling amount of the trigger switch 5.

According to the above-described embodiment, the following effects can be obtained.

(1) In the above-described embodiment, the micro-computer 4 is shifted to the fixed control mode in response to a predetermined operation being performed to the tact switch 6, and the brushless motor 1 in the fixed control mode is controlled in accordance with a pulling amount of the trigger switch 6 at the time when the predetermined operation is performed to the tact switch 6. Accordingly, the control according to the operation amount can be continuously performed without mechanically fixing the trigger switch 5 even when a worker does not continuously keep the trigger switch 5 in a constant pulling amount (operation amount). Further, regarding the configuration, since it is only necessary to add the tact switch 6, it is convenient and cost can be reduced.

(2) Since the vicinity of a rotational speed in which the noise value is significantly large as compared to surrounding rotational speeds is defined as a fixing prohibited range of the rotational speed in the fixed control mode, it is possible to reduce the noise in the fixed control mode.

While description has been made in connection with embodiments of the present invention, it will be obvious to those skilled in the art that various changes and modification may be made therein without departing from the scope of the present invention. A modification thereof will be described.

The input part is not limited to the trigger switch 5 described in the illustrative embodiment but may be any other input device such as a throttle grip.

The switching part is not limited to the tact switch 6 described in the illustrative embodiment but may be any other switch.

The motor is not limited to the brushless motor 1 described in the illustrative embodiment but may be a motor with brush, as long as the motor can be controlled in accordance with an operation amount of the input part.

Control of the brushless motor 1 by the micro-computer 4 is not limited to the control of the rotational speed according to a pulling amount of the trigger switch 5 but may be any other control such as current control or output control according to a pulling amount of the trigger switch 5. In this case, the brushless motor 1 is controlled so that load current or output is to be constant in the fixed control mode.

The electric working machine is not limited to the cordless portable blower described in the illustrative embodiment but may be various electric tools such as an electric bush cutter, an electric dust collector, a belt sander or a rotary band saw.

The present invention provides illustrative, non-limiting aspects as follows:

(1) In a first aspect, there is provided an electric working machine including: an input part; a control unit configured to control a motor in accordance with an operation amount of the input part; and a switching part; wherein, when a predetermined operation is performed to the switching part, the control unit shifts to a fixed control mode in which the motor is controlled in accordance with an operation amount of the input part at the time when the predetermined operation is performed to the switching part, irrespective of an operation amount of the input part after the predetermined operation is performed to the switching part.

(2) In a second aspect, there is provided the electric working machine according to the first aspect, wherein the control unit controls the motor to rotate in a rotational speed corresponding to the operation amount of the input part.

(3) In a third aspect, there is provided the electric working machine according to the second aspect, wherein a fixing prohibited range is set to the rotational speed of the motor in the fixed control mode.

(4) In a fourth aspect, there is provided the electric working machine according to the second or third aspect, wherein, if the rotational speed of the motor when the predetermined operation is performed is within the fixing prohibited range, the rotational speed of the motor in the fixed control mode is fixed to an alternative rotational speed which is outside of the fixing prohibited range and approximate to the rotational speed of the motor when the predetermined operation is performed.

(5) In a fifth aspect, there is provided the electric working machine according to any one of the first to fourth aspects, wherein the fixed control mode is released if the input part returns to an initial position during execution of the fixed control mode and then the input part is operated by an operation amount which is equal to or greater than the operation amount of the input part when shifting to the fixed control mode.

(6) In a sixth aspect, there is provided the electric working machine according to any one of the first to fifth aspects, wherein the input part is biased toward an initial position.

(7) In a seventh aspect, there is provided the electric working machine according to any one of the first to sixth aspects, wherein electric signal is transmitted to the control unit by operating the switching part.

Any combinations of the above-described components, and modifications thereof in a method or system are also effective as an aspect of the present invention.

What is claimed is:

1. An electric working machine comprising:
    a control unit configured to control a brushless motor at a set rotational speed;
    a motor control circuit including a switch element; and
    an input part which can be operated by a user to set a rotational speed;
    wherein the control unit is configured to control the brushless motor by a set rotational speed corresponding to an operated position of the input part, such that the rotational speed is maintained when the operated position is maintained, wherein, when the set rotational speed corresponding to the operated position of the input part is within a predetermined rotational speed range where a noise value becomes large as compared to noise values in surrounding rotational speeds, the control unit is configured to control the brushless motor by an alternative rotational speed which is set so as to avoid the predetermined rotational speed range by controlling a duty ratio of a drive signal applied to the motor control circuit, and wherein, between a maximum rotational speed that can be set by the input part and a minimum rotational speed that can be set by the input part, there exists a plurality of the predetermined rotational speed ranges where the noise value becomes large as compared to the noise values in the surrounding rotational speeds.

2. The electric working machine according to claim 1 wherein, when a first rotational speed corresponding to the operated position of the input part is out of the predetermined rotational speed range, the control unit controls the rotational speed of the brushless motor by the first rotational speed corresponding to the operated position of the input part, and wherein, when a second rotational speed corresponding to the operated position of the input part is within the predetermined rotational speed range, the control unit controls the rotational speed of the brushless motor by a rotational speed out of the predetermined rotational range.

* * * * *